Dec. 6, 1927.
H. F. BLOMQUIST ET AL
1,651,507
COMBINED PRESSURE REDUCING AND GAS FLOW REGULATING VALVE
Filed June 28, 1927  2 Sheets-Sheet 1
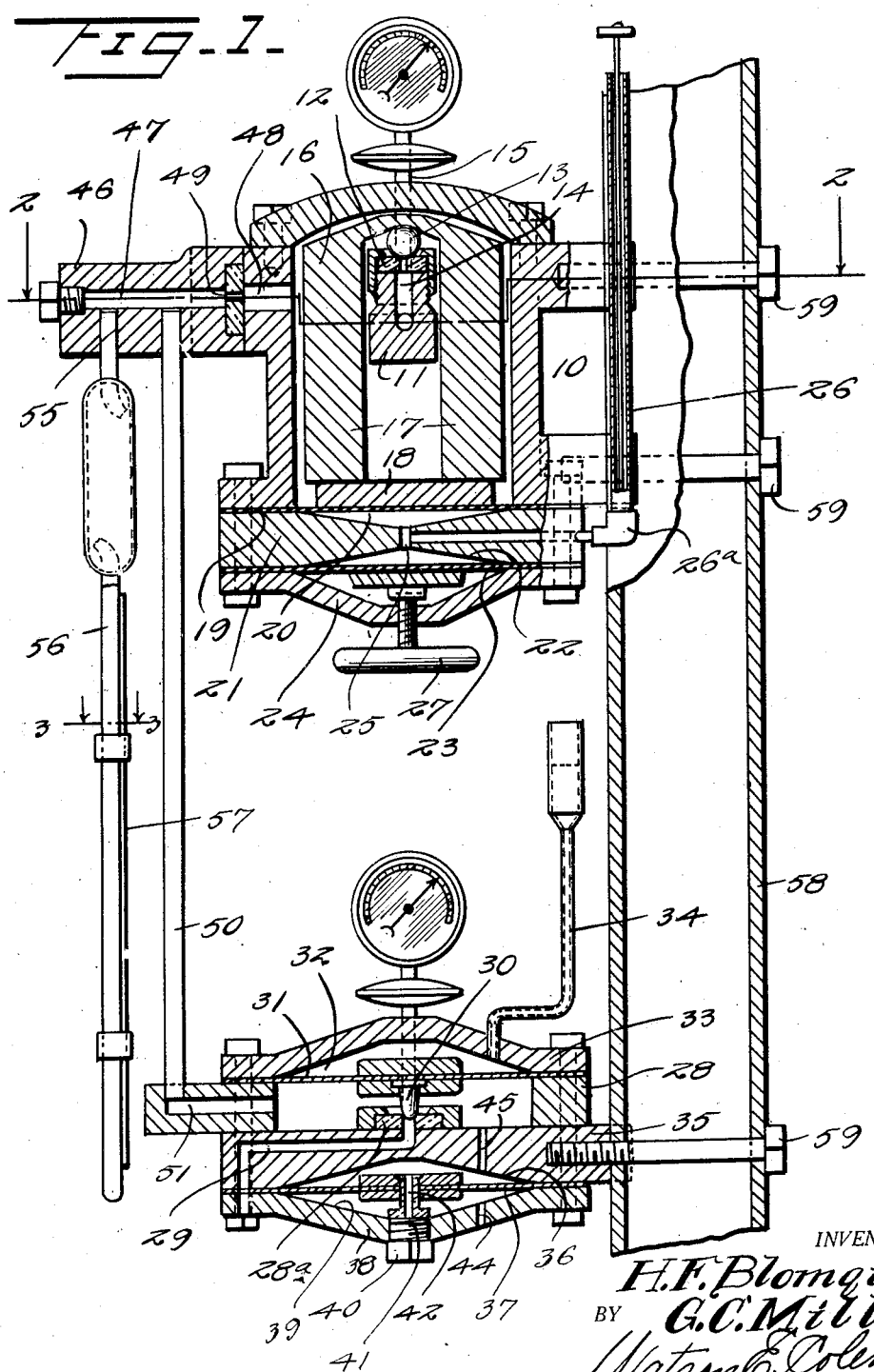
INVENTOR.
H.F. Blomquist
G.C. Miller
BY
Watson E. Coleman
ATTORNEY.

Dec. 6, 1927.  1,651,507
H. F. BLOMQUIST ET AL
COMBINED- PRESSURE REDUCING AND GAS FLOW REGULATING VALVE
Filed June 28, 1927   2 Sheets-Sheet 2
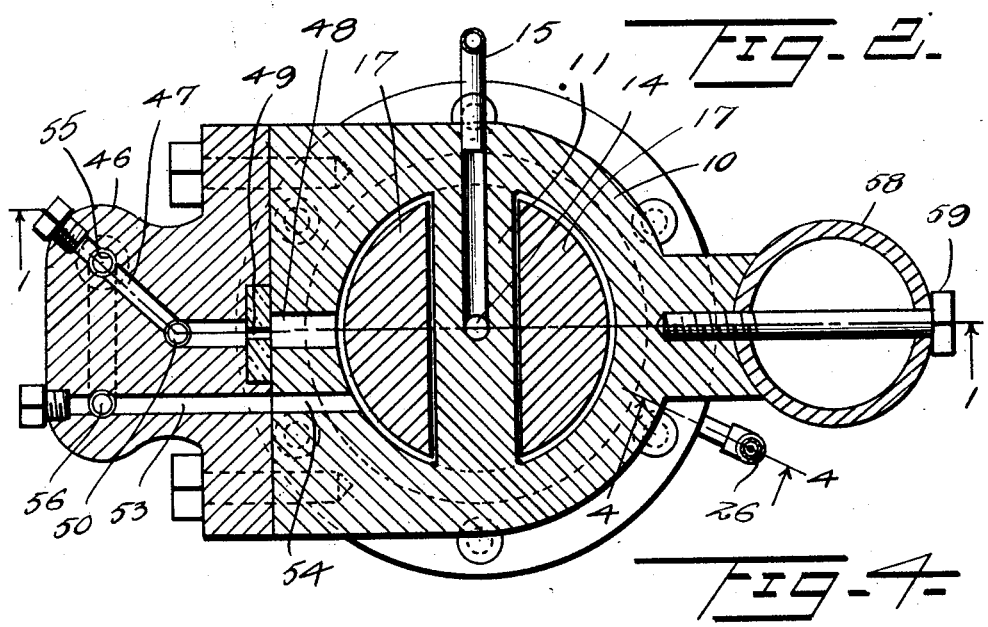
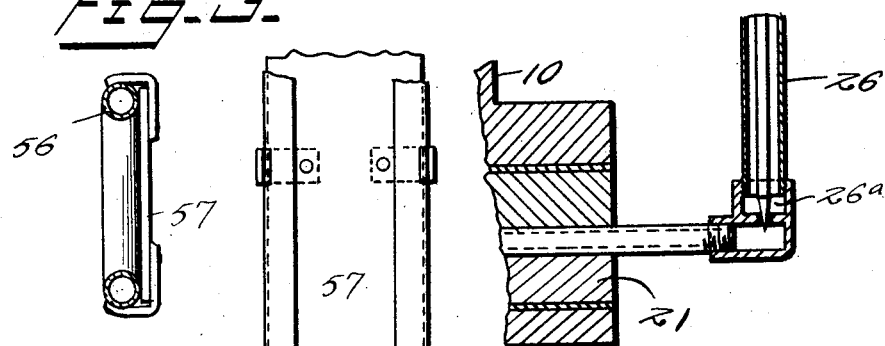
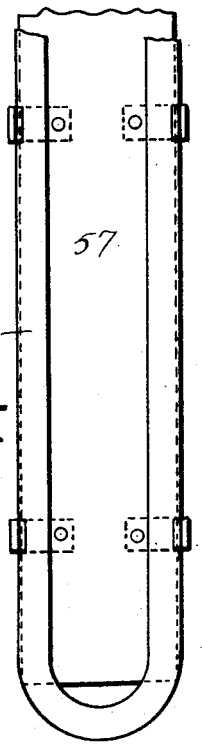
INVENTOR.
H.F. Blomquist
BY G.C.Miller
Watson&Coleman
ATTORNEY.

Patented Dec. 6, 1927.

1,651,507

UNITED STATES PATENT OFFICE.

HJALMER FREDERICK BLOMQUIST AND GEORGE C. MILLER, OF CEDAR RAPIDS, IOWA.

COMBINED PRESSURE-REDUCING AND GAS-FLOW-REGULATING VALVE.

Application filed June 28, 1927. Serial No. 202,032.

This invention relates to a combined pressure reducing and gas flow regulating valve and more particularly to a valve of this character for handling chlorine and similar corrosive gases which are employed in the purification of water and other liquids.

An important object of the invention is to produce a control mechanism which will permit the pressure of the gas to be very closely controlled between certain limits and by means of which the regulation may be very readily effected.

A further and more specific object of the invention is to provide a valve of this character wherein a directly weighted valve controls the flow of the inlet of gas and is counterbalanced by an adjustable column of mercury, so that the pressure at which the gas will be permitted to pass the valve may be regulated.

A further object of the invention is the production of a combined back pressure and vacuum relief valve for regulating the back pressure of the gas on the discharge side of a gas measuring orifice, and to prevent the formation of a vacuum in the valve, thereby preventing the possibility of drawing water or other liquid back through the gas discharge line if the gas supply should be exhausted or shut off.

A further object of the invention is the provision of a device for controlling the flow of chlorine at a predetermined rate from a shipping cylinder in which it is transported and stored under a high pressure to water for sterilization under low pressure, embodying means to reduce the gas pressure at which it is confined in shipment and storage and to maintain a predetermined lower back pressure and regulating the flow of gas after the regulation of the pressure thereof.

These and other objects we attain by the construction shown in the accompanying drawings wherein for the purpose of illustration is shown a preferred embodiment of our invention, and wherein Figure 1 is a vertical sectional view through a combined pressure reducing and gas regulating valve constructed in accordance with our invention, the section being taken approximately on the line 1—1 of Fig. 2.

Fig. 2 is a horizontal section on the line 2—2 of Fig. 1.

Fig. 3 is a detail sectional view on the line 3—3 of Fig. 1.

Fig. 4 is a detail section on the line 4—4 of Fig. 2, and

Fig. 5 is a detail view of the U-tube hereinafter referred to.

Referring now more particularly to the drawings, the numeral 10 generally designates a cylindrical casing at the interior of which a transversely extending bridge 11 is provided. This bridge at its center and upon its upper surface is provided with a valve seat 12, which is of glass, and upon which a glass check ball 13 seats. A port 14 formed in the bridge communicates with the valve seat at its inner end and at its outer end is adapted for connection with the feed line through which the gas to be regulated is introduced. Within the casing is disposed a weight 16 in the form of a saddle, the central portion of which rests upon the valve 13 and the lower portions of the legs 17 of which extend below the lower surface of the bridge 11. The lower ends of these legs rest upon a plate 18 which in turn rests upon a diaphragm 19, which bridges the concavity 20 formed in the upper surface of the bottom wall 21 of the casing. The under surface of the bottom wall is likewise concaved, as indicated at 22, and is bridged by a diaphragm 23 held in position against the base plate by a false bottom 24. The concavities 20 and 22 are in communication through a port 25 and are also in communication with a vertically extending mercury tube 26, the upper end of which is in communication with the atmosphere. Through the false bottom, an adjusting screw 27 extends for engagement with the lower diaphragm 23 and it will be obvious that by adjusting the screw, the height of the column within the tube 26 may be regulated, since mercury will be driven from the concavities and forced into the tube. Since the height of the mercury column opposes the diaphragm 19 and, therefore, exerts its pressure through this diaphragm and plate 18 against the combined effect of the weight and the gas pressure in the cylinder 10, it will be obvious that the adjusting screw provides a means for adjustably regulating the effective weight of the saddle and accordingly the pressure at which the valve 13 may be opened by the incoming gas, and thus maintain any desired gas pressure in the cylinder 10. In order to prevent oscillation of the counterbalancing column, which would cause fluctuations in gas pressure, a needle valve 26ª is preferably arranged in the mercury tube 26 to restrict the flow therein.

A second casing 28 is provided having arranged therein upon the bottom thereof a valve seat 28ª of glass, which communicates with a discharge port 29 through which the gas escapes to the point where it is to be employed. The valve 30 coacting with this seat is carried by a flexible diaphragm 31, which bridges the concavity 32 formed in the top wall 33 of the casing. Communicating with the space between the diaphragm and the top wall is the lower end of a vertically extending mercury tube 34, which serves to exert a substantially constant pressure against the diaphragm, tending to maintain the valve 30 closed. The under surface of the bottom wall 35 of the casing is concave, as at 36, and the diaphragm 37 bridging this concavity is held against the bottom wall by a false bottom wall 38.

The upper face of the false wall 38 is likewise concaved, as indicated at 39, and adjustable through this false wall at the center thereof is a plug 40, the upper surface of which is provided with a soft seat 41, which receives the end of a ported glass valve 42 carried by the diaphragm to seal the same and prevent communication between spaces at opposite sides of the diaphragm. The false wall 38 has a port 44 communicating with one of these spaces and the other of the spaces is in communication with the interior of the casing 28 by a port 45. It will be obvious that upon the formation of a partial vacuum within the casing 28, this vacuum will be transmitted to the upper surface of the diaphragm, causing the diaphragm to flex and the valve 42 to disengage from its seat, admitting air through the port 44, the port of the valve 42 and port 45 to the casing.

Applied to the side wall of the casing 10 is an outlet fitting 46 having an exhaust port 47 which coacts with an exhaust port 48 formed in the wall. The wall engaging face of the fitting 46 is rabbeted about the port 47 to provide a seat for a glass measuring orifice 49 providing a fixed opening between the exhaust port 47 and the interior of the casing 10. The conduit, designated at 50, connects the exhaust port 47 of the fitting 46 with an intake port 51 of the casing 28. The exhaust fitting 46 is likewise provided with a port 53 communicating with a port 54 formed through the wall of the casing 10, and a branch port 55 communicating with the exhaust port 47. A U-tube 56 has its ends in communication with the ports 53 and 55, and accordingly in communication with the gas fed through the apparatus at opposite sides of the orifice 49. Within this U-tube a suitable liquid is disposed and operates to indicate the rate of flow of gas through the device. A calibrated scale 57 is adjustably mounted upon this U-tube, so that the zero of the scale may be disposed at the proper point with relation to the liquid of the tube and the rate of flow per unit of each may be read upon this scale.

It will be obvious that in operation, gas entering the casing 10 from the source is opposed in its entrance by the combined effect of the weight of the saddle 16 and the gas pressure in the cylinder 10 minus the weight of the column of mercury in the tube 26 which is opposed thereto, so that gas will only enter the casing at a predetermined pressure. This gas passes through measuring orifice 49 and through the conduit 50 to the casing 28 from which it may not escape until the pressure within this casing builds up sufficiently to overcome the weight of the mercury column in the tube 34. Thus, the gas pressure on both sides of the orifice is regulated, and since the rate of flow of any gas through an orifice varies with the difference of the pressure on the two sides of such orifice, it is obvious that any predetermined rate of flow of gas through the device may be obtained. In event the gas becomes exhausted in operation and there is a tendency to formation of vacuum in the casing 28, which would draw the water or other liquid in which the gas is discharging into the apparatus, this vacuum will be broken by movement of the diaphragm 37 which unseats the port valve 42. The casings 28 and 10 will be secured to a supporting standard 58 by bolts 59.

It will be obvious that a device of this character will provide for a very minute regulation of the flow of the gas and of the pressure at which the gas is discharged. It will also be obvious that the construction hereinbefore set forth is capable of a certain range of change and modification wthout materially departing from the spirit of the invention and we accordingly do not limit ourselves to such specific structure except as hereinafter claimed.

We claim:—

1. In a regulating valve for gas and the like, a casing having an intake, a valve controlling the intake, a weight opposing opening of the valve and sealed within the casing, the casing having a movable wall from which said weight may be supported and a fluid column for urging said movable wall to a position where it supports the combined effect of the weight and the internal gas pressure in the casing.

2. In a regulating valve for gas and the like, a casing having an intake, a valve controlling the intake, a weight opposing opening of the valve and sealed within the casing, the casing having a movable wall from which said weight may be supported, a fluid column for urging said movable wall to a position where it supports the combined effect of the weight and the internal gas pressure in the casing and means for adjusting the static head of the fluid column.

3. In a regulating valve for gas and the like, a casing having an intake, a valve controlling the intake, a weight opposing opening of the valve and sealed within the casing, the casing having a movable wall from which said weight may be supported, a fluid column for urging said movable wall to a position where it supports the combined effect of the weight and the internal gas pressure in the casing, the column communicating with a chamber one wall of which comprises said movable wall, a second movable wall for the chamber and means for adjusting said second movable wall to force fluid from the chamber into the column to thereby regulate the height thereof.

4. In a regulating valve for gas and the like, a casing having an intake, a valve controlling the intake, a weight opposing opening of the valve and sealed within the casing, the casing having a movable wall from which said weight may be supported, a fluid column for urging said movable wall to a position where it supports the combined effect of the weight and the internal gas pressure in the casing, said chamber having an orificed outlet and means for maintaining a constant back pressure against the outlet.

5. In a regulating valve for gas and the like, a casing having an intake, a valve controlling the intake, a weight opposing opening of the valve and sealed within the casing, the casing having a movable wall from which said weight may be supported, a fluid column for urging said movable wall to a position where it supports the combined effect of the weight and the internal gas pressure in the casing, a second casing, a discharge line connecting the first and second casings, a valve-controlled outlet for said second casing, means resisting opening of the valve of the outlet of the second casing with a constant pressure and a measuring orifice contained in said discharge line.

6. In a regulating valve for gas and the like, a casing having an intake, a valve controlling the intake, a weight opposing opening of the valve and sealed within the casing, the casing having a movable wall from which said weight may be supported and a fluid column for urging said movable wall to a position where it supports the combined effect of the weight and the internal gas pressure in the casing, said valve and its seat being of non-corrodible material.

7. In a regulating valve for gas and the like, a casing having an intake, a valve controlling the intake, a weight opposing opening of the valve and sealed within the casing, the casing having a movable wall from which said weight may be supported, a fluid column for urging said movable wall to a position where it supports the combined effect of the weight and the internal gas pressure in the casing, a second casing, a discharge line connecting the first and second casings, a valve-controlled outlet for said second casing, means resisting opening of the valve of the outlet of the second casing with a constant pressure, a measuring orifice contained in said discharge line, a U-tube communicating at one end with the discharge line beyond the orifice from the first named casing and at its opposite end from the interior of the first named casing and an indicating fluid within said tube.

8. In a regulating valve for gas and the like, a casing having an intake, a valve controlling the intake, a weight opposing opening of the valve and sealed within the casing, the casing having a movable wall from which said weight may be supported, a fluid column for urging said movable wall to a position where it supports the combined effect of the weight and the internal gas pressure in the casing, a second casing, a discharge line connecting the first and second casings, a valve-controlled outlet for said second casing, means resisting opening of the valve of the outlet of the second casing with a constant pressure, a measuring orifice contained in said discharge line, said casing having a further outlet and a ported diaphragm valve controlling said outlet.

In testimony whereof we hereunto affix our signatures.

HJALMER FREDERICK BLOMQUIST.
GEORGE C. MILLER.